(12) United States Patent
Bove et al.

(10) Patent No.: US 12,328,034 B2
(45) Date of Patent: Jun. 10, 2025

(54) GENERATOR, WIND TURBINE AND METHOD FOR COOLING A DIRECT DRIVE GENERATOR OF A WIND TURBINE

(71) Applicant: Siemens Gamesa Renewable Energy A/S, Brande (DK)

(72) Inventors: Stefano Bove, Lunderskov (DK); Jens Bomholt Jensen, Horsens (DK); Anders Vangsgaard Nielsen, Silkeborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 293 days.

(21) Appl. No.: 17/830,451

(22) Filed: Jun. 2, 2022

(65) Prior Publication Data

US 2022/0399767 A1    Dec. 15, 2022

(30) Foreign Application Priority Data

Jun. 9, 2021    (EP) .................................. 21178540

(51) Int. Cl.
*H02K 1/20*    (2006.01)
*H02K 9/10*    (2006.01)

(52) U.S. Cl.
CPC ................ *H02K 1/20* (2013.01); *H02K 9/10* (2013.01); *H02K 2201/03* (2013.01)

(58) Field of Classification Search
CPC .. H02K 1/20; H02K 9/10; H02K 9/08; H02K 9/12; H02K 9/14; H02K 9/16; H02K 9/18
See application file for complete search history.

(56) References Cited

U.S. PATENT DOCUMENTS 6,268,668 B1    7/2001    Jarczynski et al.
2010/0026110 A1    2/2010    Harb et al.
(Continued)

FOREIGN PATENT DOCUMENTS

CN    105186783 A    12/2015
CN    105871100 A    8/2016
(Continued)

OTHER PUBLICATIONS

European Search Report issued on Nov. 29, 2021 for application No. 21178540.7.
(Continued)

*Primary Examiner* — Tulsidas C Patel
*Assistant Examiner* — Robert E Mates
(74) *Attorney, Agent, or Firm* — Schmeiser, Olsen & Watts, LLP

(57) ABSTRACT

A generator for a wind turbine has a rotor and a stator separated radially by an air gap, wherein the stator includes at least one stator segment, which includes a stack of lamination sheets and at least one stator winding, and a stator support structure supporting the at least one stator segment, wherein the generator further includes a cooling arrangement for providing cooling fluid at least to the air gap, wherein the cooling arrangement further includes a cooling fluid flow dividing element for dividing an incoming cooling fluid flow to the stator into a first partial cooling fluid flow directed to the air gap and a second partial cooling fluid flow directed to the stator support structure.

14 Claims, 4 Drawing Sheets

(56) References Cited

U.S. PATENT DOCUMENTS

| | | | |
|---|---|---|---|
| 2011/0260467 A1* | 10/2011 | Gudewer | H02K 9/04 |
| | | | 290/1 B |
| 2011/0278969 A1 | 11/2011 | Memminger et al. | |
| 2012/0133237 A1* | 5/2012 | Kimiabeigi | H02K 3/493 |
| | | | 310/214 |
| 2012/0274159 A1 | 11/2012 | Le Besnerais | |
| 2013/0285489 A1 | 10/2013 | Airoldi | |
| 2015/0372565 A1 | 12/2015 | Airoldi | |
| 2016/0233742 A1 | 8/2016 | Airoldi et al. | |
| 2018/0274522 A1 | 9/2018 | Airoldi | |
| 2021/0037682 A1 | 2/2021 | Knauer | |

FOREIGN PATENT DOCUMENTS

| | | |
|---|---|---|
| CN | 111418274 A | 7/2020 |
| EP | 3142231 A1 | 3/2017 |
| EP | 3151384 A1 | 4/2017 |
| EP | 3273578 A1 | 1/2018 |
| EP | 3508720 A1 | 7/2019 |
| JP | 2004320974 A | 11/2004 |
| JP | 2018088736 A | 6/2018 |
| JP | 6586441 B2 | 10/2019 |

OTHER PUBLICATIONS

Lu Yi-Ping et al, 3D flow field numerical simulation of some salient synchronous motor, Electric Machines and Control, vol. 16, No. 8, Aug. 2012, 6 pages.

Han Jia-De et al, Effect of the stator ventilation ducts changes on thermal and flow field of salient synchronous motor, Electric Machines and Control, vol. 20, No. 12, Dec. 2016, 6 pages.

* cited by examiner

GENERATOR, WIND TURBINE AND METHOD FOR COOLING A DIRECT DRIVE GENERATOR OF A WIND TURBINE

CROSS-REFERENCE TO RELATED APPLICATIONS

This application claims priority to EP Application No. 21178540.7, having a filing date of Jun. 9, 2021, the entire contents of which are hereby incorporated by reference.

FIELD OF TECHNOLOGY

The following concerns a generator for a wind turbine having an, in particular outer, outer rotor and an, in particular inner, stator separated radially by an air gap, wherein the stator comprises at least one stator segment, which comprises a stack of lamination sheets and at least one stator winding, and a stator support structure supporting the at least one stator segment, wherein the generator further comprises a cooling arrangement for providing cooling fluid at least to the air gap. The following further concerns a wind turbine and a method for cooling a generator of a wind turbine.

BACKGROUND

Wind turbines serve to generate electrical power from wind power and hence comprise a generator, which is typically housed in a nacelle of the wind turbine. Such a generator is well known and converts rotational power into electrical power. A rotor comprising magnets, in particular permanent magnets, may be rotated with respect to a stator of the generator, which comprises stator windings facing the magnets of the rotor via an air gap. Due to the rotational movement of the rotor and hence the magnets relative to the windings, electrical current is induced in the stator windings. Both configurations in which an external or outer rotor is used, which rotates around the stator, as well as configurations having an internal rotor, in which the rotor rotates inside the stator, are known.

Direct drive generators have been proposed in state-of-the-art wind turbines, which hence require no gear boxes. Instead, the rotor moves with the rotational speed of the rotor hub driven by interaction of the wind with wind turbine blades.

When such generators, in particular for a direct drive wind turbine, are used, heat is generated. The largest thermal losses occur in the coil windings. In known generators, in particular direct drive generators, the stator windings are supported by one or more stacks of lamination sheets, which usually define stator teeth. The stator windings can then be placed in spaces between the stator teeth. According to the state of the art, heat is removed from the stator windings and hence the coil by thermal conduction to the lamination. The stack of lamination sheets is then, in turn, cooled by air passing through the air gap. Additionally, it has been proposed to use a number of radially oriented air ducts through the at least one stack of lamination sheets. However, a large portion of the heat is conducted along the stacking direction of the stack of lamination sheets (axial direction), which features low thermal conductivity. EP 3 151 384 A1 discloses a generator of a wind turbine, which comprises a stator and a rotor, wherein radial cooling ducts in the lamination stacks are provided by stacking first and second lamination sheets with different through openings radially extending between air gap and non-air gap-side of the stator.

In known wind turbines, the cooling fluid, usually air, hence passes the coil overhang, cools the air gap and furthermore the stator segments by passing through the radial cooling ducts. However, due to the small passages for the cooling fluid, a huge pressure loss occurs, resulting in a higher power consumption of the pumping means, for example fans.

Furthermore, improved cooling would lead to an increase in annual energy production.

SUMMARY

An aspect relates to provide an efficient, easy to realize cooling scheme for the stator of a generator, in particular in a direct drive wind turbine, which allows improved cooling.

In a generator as initially described, according to embodiments of the invention, the cooling arrangement further comprises a cooling fluid flow dividing element for dividing an incoming cooling fluid flow to the stator into a first partial cooling fluid flow directed to the air gap and a second partial cooling fluid flow directed to the stator support structure.

It is hence proposed to separate the cooling fluid, in particular air, such that a first portion of the cooling fluid is directed to the coil overhang, the air gap and the stator segments in a first partial cooling fluid flow and the remaining second portion of the cooling fluid is directed to the non-air gap side of the stator segments, in particular in the stator support structure. Hence, the stator segments are cooled both on the air gap side as well as on the non-air gap side. It is noted that, in this manner, also the cooling of stator heat from the stator support structure is improved.

This design of the cooling arrangement not only allows a more efficient cooling of the stator by introducing more cooling surface, but also reduces the cooling fluid pressure loss, in particular pressure loss, which results in an increased cooling fluid mass flow at the same power consumption of pumping means, in particular fans and/or blowers for air as cooling fluid.

It is noted that, although embodiments may relate to a direct drive wind turbine, the concept described here may, of course, also be applied in geared wind turbines. Analogously, embodiments of the invention may not only be realized for an inner stator, but also for an outer stator.

The incoming cooling fluid flow may be provided by at least one pumping means, in particular a fan and/or blower in the case of air, at least one side of the stator, that is, the drive end side and/or the non-drive end side. In known generators for wind turbines, usually, an incoming cooling fluid flow is provided at both the drive end side and the non-drive end side, wherein, for example, radial cooling ducts in the stator segments may be used to guide the cooling fluid from the air gap side to the non-air gap side of the stator segment.

In such an arrangement, the cooling fluid flow dividing elements may be provided on both sides, that is, the drive end side as well as the non-drive end side.

The cooling fluid flow dividing element may be shaped to create the partial cooling fluid flows with predetermined fractions of the incoming cooling fluid flow. In particular, the overall cooling fluid flow can be optimized to direct the cooling fluid to those stator parts which require the most cooling. Hence, different designs of cooling fluid flow dividing elements, which may, for example, be air guides, can be taken into account. In particular, the separation of the cooling fluid can be optimized such that the relevant amount of air that cools the air gap side and the non-air gap side of the stator segments, respectively, is optimized. For example, simulations may reveal where the most heat is generated, and the highest amount of cooling is required. In embodiments, the first partial cooling fluid flow may comprise 50 to 80% of the cooling fluid, while the second partial cooling fluid flow may comprise 20 to 50% of the cooling fluid.

The second cooling fluid flow may be directed to at least one area and/or element of the stator support structure, which is directly adjacent to the radially inner end, that is, the non-air gap end, of the at least one segment. In particular, the second partial cooling fluid flow may be directed to a cooling channel in and/or a radially inner surface of a segment support element. In this manner, the cooling fluid of the second partial cooling fluid flow is guided close to the "hot spots" of the stator, since most of the heat is generated in the stator segments, in particular by the stator windings of the stator coils.

In known designs, a stator may comprise multiple segments, for example six or eight segments. These segments are to be held and stabilized by the stator support structure, which may, for example, comprise two end blades, one for the drive end side and one for the non-drive end side. Segment support elements may be fixed to the stator such that the stator segments may be firmly attached to these segment support elements, for example welded or bolted. For example, one segment support element may be provided for each stator segment. According to embodiments of the invention, cooling channels may be provided within such segment support elements, for example directly adjacent to the stack of lamination sheets of the respective stator segment, providing cooling of the hot lamination sheets. However, such a cooling channel may also extend inside such a segment support element, wherein the segment support element is heat-conductively connected to the stator segment. This is also advantageous if the non-air gap side surface of stator support elements is to be cooled.

As already explained, the stator segment may further comprise at least one radially extending cooling duct having an opening to the air gap, wherein the first partial cooling fluid flow at least partly enters the at least one cooling duct. In this manner, radial cooling is provided at multiple axial positions along each stator segment.

In such a configuration, the first and second partial cooling fluid flows may, in a first alternative embodiment, be at least partly rejoined at a radially inner (or outer, in the case of an outer stator) opening, that is non-air gap side opening, of the at least one cooling duct. Since the radial cooling ducts usually have an opening on the non-air gap side of the stator segment, where the second partial cooling fluid flow is directed, the partial cooling fluid flows may be re-joined. The again combined outgoing cooling fluid flow may then be guided to an exhaust, or, in the case of cooling circuit, to a heat exchanger, such that the first and the second partial cooling fluid flows share at least a part of their cooling path.

In a second alternative, however, both partial cooling fluid flows may be completely separated over their whole cooling path. In this manner, if the cooling fluid along one of the cooling paths has taken up more heat, thus has a higher temperature, it will not unnecessarily warm up the cooling fluid of the other cooling path where they are joined, such that the cooling efficiency of the other cooling path is maintained.

In embodiments, the cooling arrangement may comprise a closed cooling circuit for the cooling fluid flow. For example, air as a cooling fluid may be circulated inside the direct drive generator and be cooled by a heat exchanger, which is, for example, supplied with cool water from another cooling circuit, wherein the cooling water may be cooled by ambient air of the wind turbine.

In concrete embodiments, the cooling circuit may comprise a heat exchanger located in an inner chamber of the stator support structure. In many embodiments, as already indicated, the stator support structure is hollow, comprising mainly the end plates and, for example, segment support elements fixed to the end plates. Hence, the hollow chamber provides room for a heat exchanger as well as cooling fluid guiding means, for example tubes, such that the cooling fluid, in particular from both partial cooling fluid flows, may be transported to the heat exchanger and, from there, to openings in the end plates, where pumping means, in particular fans and/or blowers, pump the cooling fluid again in the direction of the cooling fluid flow dividing element. Since the generator, in particular having an inner stator, in a wind turbine is usually mounted to a hollow shaft, components of the cooling arrangement may, for example be mounted to this hollow shaft.

However, embodiments of the invention can alternatively also be applied to so-called direct cooling system, where, for example, ambient air is directly used to cool the stator. That is, the cooling arrangement may also comprise an open cooling circuit for the cooling fluid flow.

In embodiments, the stator support structure may comprise cooling fins and/or a cooling channel, in particular passing the cooling fins, wherein the second cooling fluid flow is directed to the cooling fins and/or the cooling channel. Cooling fins, in particular in the area of the non-air gap side of the stator segments, further improve the cooling, since a higher cooling surface is provided. In particular, these cooling fins may be provided in cooling channels for the second partial cooling fluid flow.

For example, in concrete embodiments, the stator support structure may comprise at least one, in particular cast and/or printed and/or machined, element having a structured surface providing the cooling fins and/or the cooling channel. In particular, such an element may be the already-mentioned segment support element. If, for example, the segment support element has a structured surface providing a cooling channel and cooling fins, the open surface structure may be closed by fixing the element to the stator segment, the non-drive end surface of which forming a wall of the cooling channel. Generally, in all embodiments, also this none-drive end surface of the stator segment may be modified to comprise cooling fins protruding into the cooling channel.

In other embodiments, however, it is also possible that the cooling channel is formed by the contacting surfaces of two adjacent sub-elements of the stator support structure, wherein at least one of the contacting surfaces is a structured surface. That is, a sandwiched configuration is also conceivable, wherein both surfaces are comparably structured, such that the surface structures combined form the cooling fins and/or the cooling channel.

The cooling fluid flow dividing element may comprise at least one actuator for adjusting the distribution of the incoming cooling fluid flow to the partial cooling fluid flows, wherein the actuator is controllable by at least one control device of the cooling arrangement, in particular depending on measured temperature information regarding the first and second partial cooling flows. The cooling fluid flow dividing element may thus be adjustable, for example by changing the orientation of a cooling fluid guiding element of the cooling fluid flow dividing element with regard to the incoming cooling fluid flow, or to change effective guiding surfaces of the cooling fluid flow dividing element. Also, a valve type actuator, for example an active flow valve, may be used, which may be associated to at least one of the partial cooling fluid flows. In particular, the fractions of the incoming cooling fluid flow distributed to the partial cooling fluid flows may be adjusted.

In an exemplary embodiment, the cooling arrangement may further comprise at least one temperature sensor, wherein the control device is configured to control the at least one actuator to adjust the distribution of the incoming cooling fluid flow to the partial cooling fluid flows depending on sensor data from the at least one temperature sensor. For example, the sensor data may describe the temperature distribution regarding the cooling paths of the partial cooling fluid flows, such that, if there is more heat along one of the cooling paths, more cooling fluid may be distributed to the corresponding partial cooling fluid flow.

As already explained, the new approach, wherein the cooling fluid flow is separated into two partial cooling fluid flows, also reduces the pressure loss, such that, when using the same pumping means, in particular fans and/or blowers, at the same power, improved cooling may be provided. However, it is also possible to reduce a power for the pumping means, such that the same cooling performance as in known wind turbines can be achieved, jet using less energy.

In a concrete example, experiments have shown that at an ambient temperature of 30° C. and a wind speed of 15 m/s, the maximum temperature in the winding of the stator may be reduced by approximately 10° C. by employing the cooling scheme of embodiments of the invention. As a rule of thumb, 10° C. reduction in temperature is equivalent to about 0.5 to 1% annual energy production. In these experiments, it could also be shown that, using the same power for the pump or pumping means, the pressure loss was reduced from 1913 Pa to 1506 Pa, while the cooling fluid mass flow was increased from 28.9 kg/s to 36.8 kg/s.

Embodiments of the invention also concern a wind turbine, in particular a direct-drive wind turbine, comprising a generator according to embodiments of the invention. All features and remarks regarding the generator can be analogously applied to the wind turbine according to embodiments of the invention, such that the same advantages can be achieved.

Embodiments of the invention further concern a method for cooling a generator of an, in particular direct drive, wind turbine, the generator having an, in particular outer, rotor and an, in particular inner, stator separated by an air gap, wherein the stator comprises at least one stator segment, which comprises a stack of lamination sheets and at least one stator winding, and a stator support structure supporting the at least one stator segment, wherein the generator further comprises a cooling arrangement for providing cooling fluid at least to the air gap, wherein an incoming cooling fluid flow to the stator is divided into a first partial cooling fluid flow directed to the air gap and a second partial cooling fluid flow directed to the stator support structure by a cooling fluid flow diving element of the cooling arrangement.

All features and remarks regarding the generator and the wind turbine according to embodiments of the invention accordingly apply to the method according to embodiments of the invention, such that the same advantages can be achieved.

BRIEF DESCRIPTION

Some of the embodiments will be described in detail, with reference to the following figures, wherein like designations denote like members, wherein.

DETAILED DESCRIPTION

Figure 1:
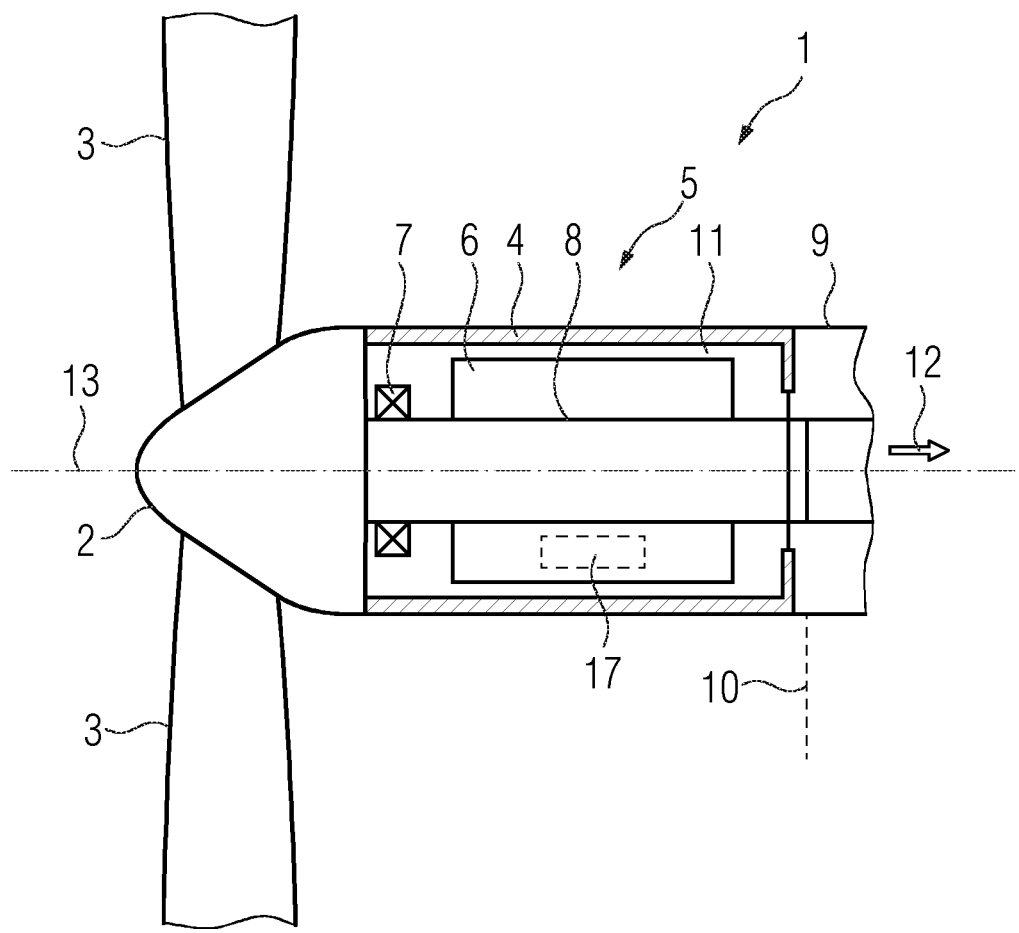
FIG. 1 shows a schematic drawing of a wind turbine according to embodiments of the invention.

FIG. 1 is a principle drawing of a wind turbine 1 according to embodiments of the invention. The wind turbine 1 is a direct-drive wind turbine which can be used in onshore as well in offshore applications.

The wind turbine 1 comprises a rotatable rotor hub 2, to which a number of rotor blades 3, for example three rotor blades 3, are attached. The rotor hub 2 is adapted to transfer rotational movements to a rotor 4 of a generator 5 of the wind turbine 1, which is only crudely indicated in FIG. 1. The outer rotor 4 is rotatably supported relative to an inner stator 6 and comprises permanent magnets (not shown) mounted on its inner surface and facing a stator 6. The rotor 4 is supported on a bearing unit 7 disposed on a non-rotatable hollow shaft 8, to which also the stator 6 is mounted. Adjacent to the generator 5 at its non-drive end is the nacelle 9 which is supported by a tower 10, which is only indicated in FIG. 1.

An air gap 11 extends between the stator 6 and the permanent magnets of the rotor 4 in an axial direction 12. The radial dimensions of the air gap 11 may, for example, be approximately 6 mm. The generator 5 has an external rotor configuration, which may also be termed "outer rotor 4—inner stator 6" configuration. The rotational axis 13 of the rotor 4 is also indicated in FIG. 1.

Figure 2:
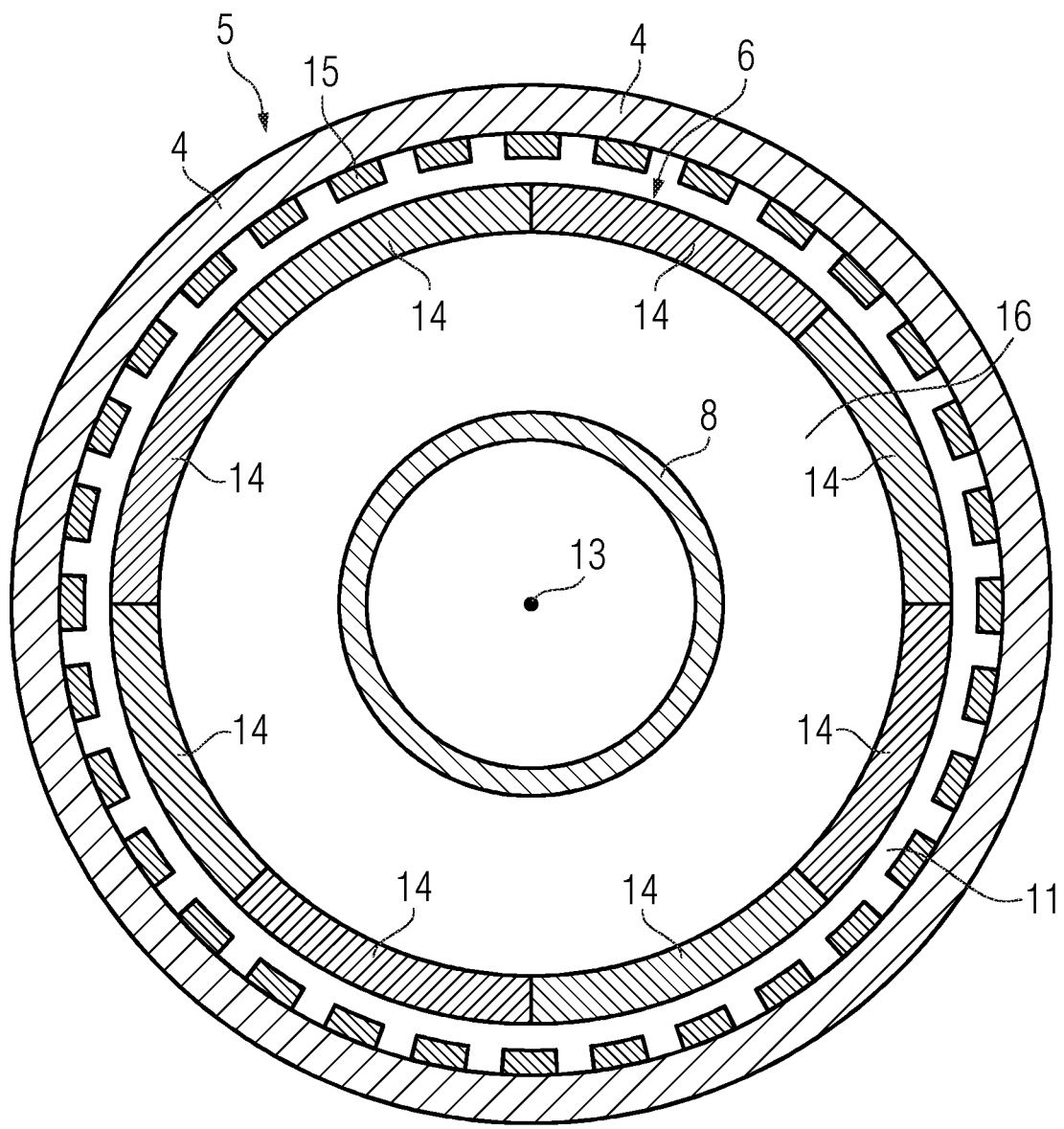
FIG. 2 shows a principle cut view of the generator of the wind turbine of FIG. 1.

FIG. 2 is a principle cross-sectional view of the generator 5. As can be seen, the stator 6 is circumferentially segmented and comprises circumferentially disposed, ring-segment-like shaped stator segment 14. Each rotor segment 14 comprises a stack of lamination sheets defining stator teeth, such that stator windings can be placed in recesses between the stator teeth.

The rotor 4 comprises a number of permanent magnets 15 on its stator-facing side. The adjacent stator segments 14 are fixed to each other and to a stator support structure 16 not shown in detail in FIG. 2.

In operation, heat is generated, in particular in the stator windings, and transferred to the lamination stack. To cool the stator 6, the wind turbine 1 further comprises a cooling arrangement 17 only indicated in FIG. 1 and further explained with respect to FIG. 3.

Figure 3:
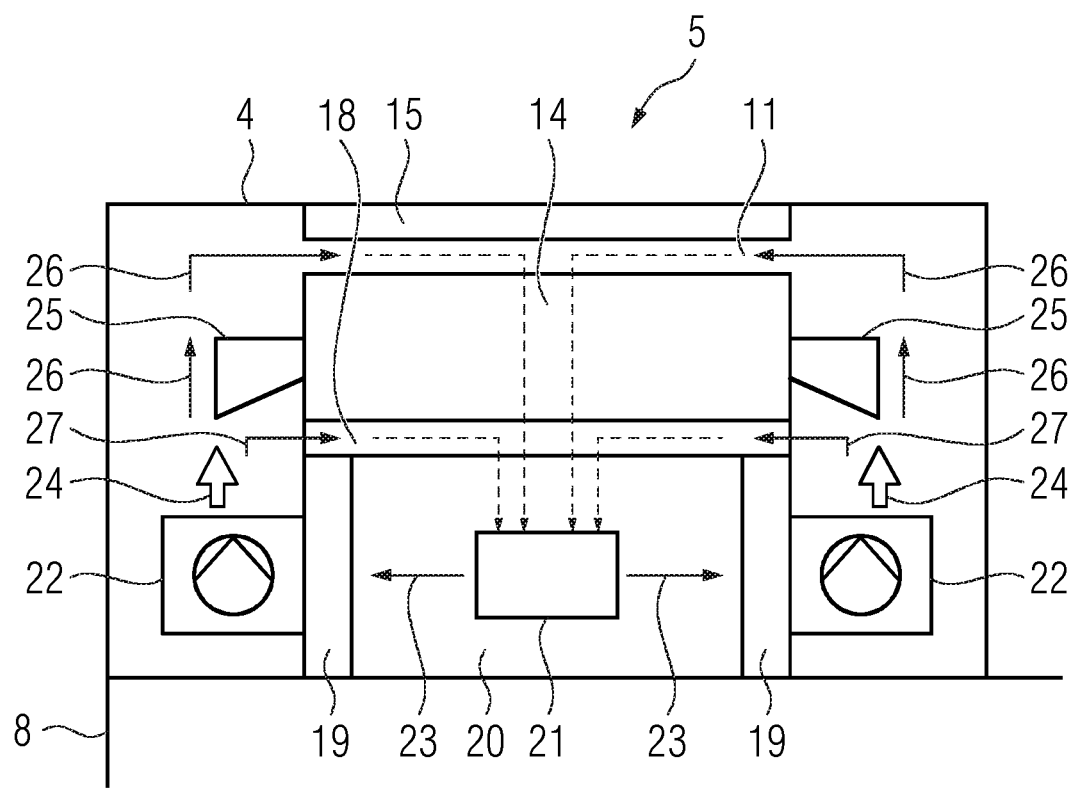
FIG. 3 shows a schematical drawing of the cooling scheme employed in the current embodiments of the invention.

In FIG. 3, the generator 5 is schematically shown. As can be seen, the stator segment 14 is fixed to a segment support element 18 of the stator support structure 16. The stator support structure 16 also comprises two end plates 19, one on the drive end side and one on the non-drive end side. A hollowed chamber 20 is formed within the stator support structure 16.

In this embodiment, the cooling arrangement 17, whose components are indicated as well as the principle cooling fluid path, in this case comprises a closed cooling circuit, wherein air is used as a cooling fluid. The cooling arrangement hence comprises a heat exchanger 21 located inside the chamber 20. From the heat exchanger 21, cooling fluid is transported through the end plates 19 to pump or pumping means 22, in this case fans and/or blowers, on the drive end side as well as the non-drive end side, as indicated by arrows 23. The fans 22 generate an incoming cooling fluid flow 24 in a radially outward direction. In this cooling arrangement, however, the incoming cooling fluid flow 24, in this case incoming air flow, is divided by a cooling fluid flow dividing element 25, such that a first partial cooling fluid flow 26, in this case partial air flow, directed to the air gap 11 and a second partial cooling fluid flow 27, in this case partial air flow, directed to the non-air gap side of the stator segment 14, in this case into the segment support elements 18 of the stator support structure 16, are generated. The shape and configuration of the cooling fluid flow dividing element 25 is chosen such that the cooling efficiency is maximized.

The concrete cooling paths for the two partial cooling fluid flows 26, 27 are only schematically indicated as dashed lines in FIG. 3, since multiple options, which will be explained below, exist.

Hence, the incoming cooling fluid flow 24 is divided so that a portion of the cooling fluid, in this case air, also cools the non-air gap side of the stator segment 14. This provides improved cooling of the stator 6 as a whole.

Figure 4:
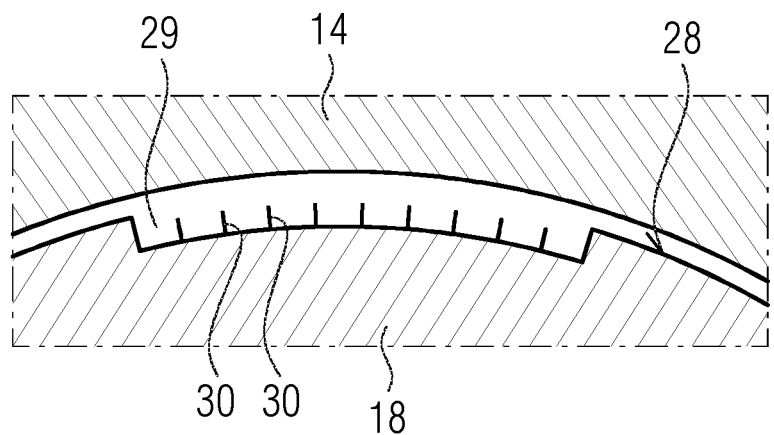
FIG. 4 shows a sectional detailed view of a cooling channel with fins in a first embodiment.

In particular, the second partial cooling fluid flow 27 may be guided through the stator support structure 16, in particular the segment support elements 18, by cooling channels and/or along cooling fins for increasing the cooling surface. The cooling channels and cooling fins may be generated by providing structured surfaces, as exemplarily shown in the embodiments of FIG. 4 and FIG. 5. According to FIG. 4, a surface 28 of a segment support element 18, which is directly adjacent to a surface of the stator segment 14, is structured such that a cooling channel 29 with cooling fins 30 therein results. The cooling channel 29 and the cooling fins 30 are directly adjacent to the lamination stack of the stator segment 14, which may also have cooling fins on its non-air gap side surface (not shown).

Figure 5:
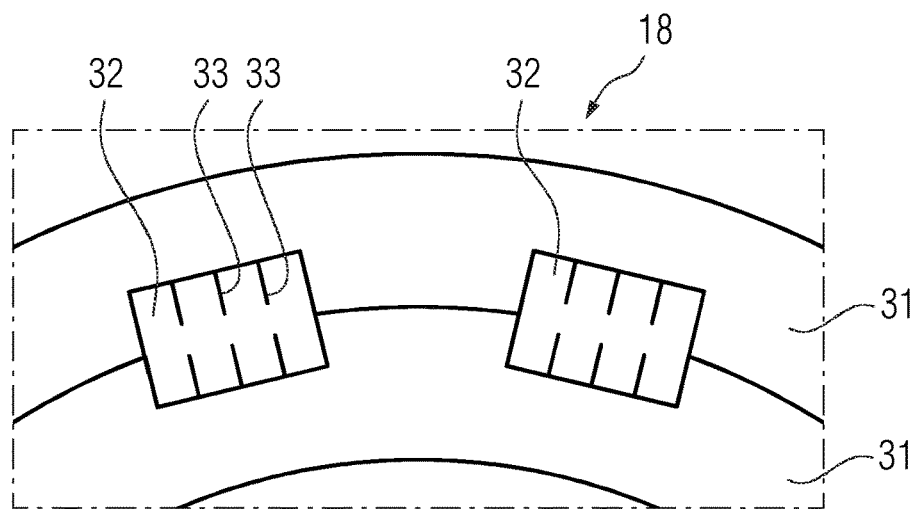
FIG. 5 shows a sectional detailed view of cooling channels with cooling fins in a second embodiment.

In the embodiment of FIG. 5, two sub-elements 31 of segment support element 18 having like surface structures have been sandwiched together to generate cooling channels 32 each having cooling fins 33.

Such elements and sub-elements having structured surfaces may, for example, be cast, printed and/or machined.

Figure 6:
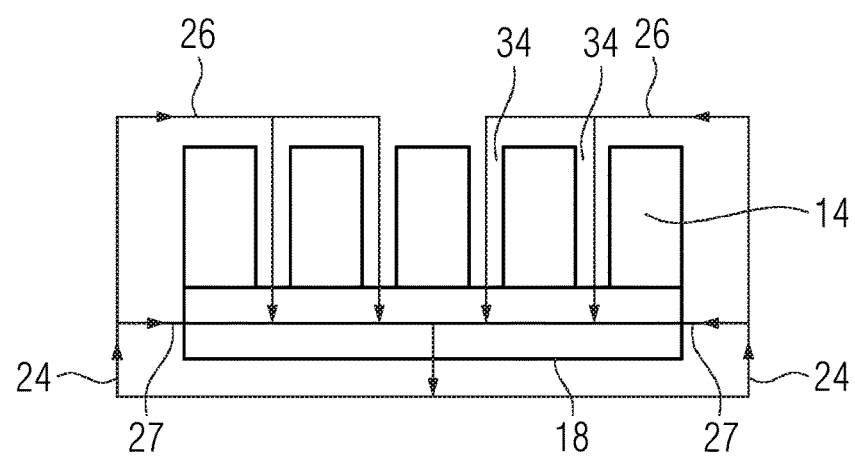
FIG. 6 shows a schematical view of cooling fluid guidance in a first alternative.
Figure 7:
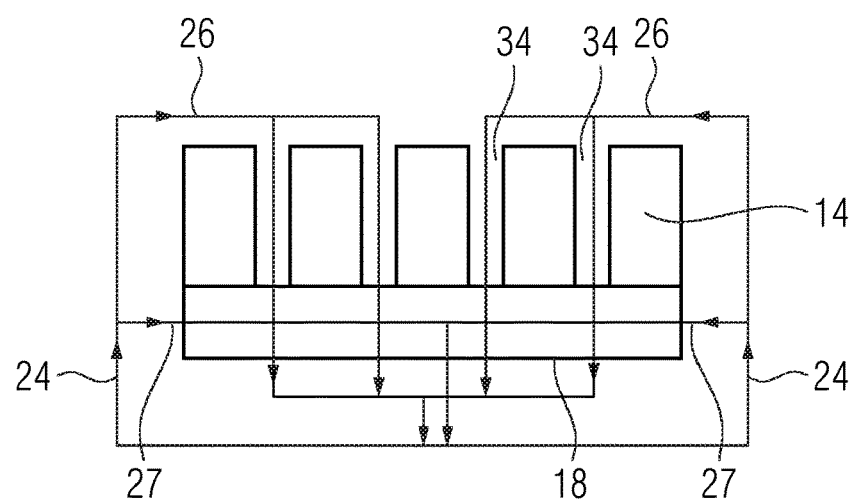
FIG. 7 shows a schematical view of cooling fluid guidance in a second alternative.

FIG. 6 and FIG. 7 show options for concrete cooling paths of the first and second partial cooling fluid flows 26, 27. As can be seen, the stator segment 14 comprises radial cooling ducts 34 for the cooling fluid in both these embodiments. In the alternative of FIG. 6, however, the cooling paths of the first and second partial cooling fluid flows 26, 27 are joined in the segment support element 18, for example by having the radial cooling ducts 34 open into the cooling channel 29 or 32 of the segment support element 18. Hence, the second partial cooling fluid flow 27 is only a partial bypass.

In the alternative depicted in FIG. 7, however, the partial cooling fluid flows 26, 27 have completely separate cooling paths and are not joined before reaching the heat exchanger 21. Hence, the second partial cooling fluid flow 27 can be understood as a complete bypass.

In some embodiments, the cooling fluid flow dividing element 25 may also comprise an actuator for adjusting the distribution of the incoming cooling fluid flow 24 to the partial cooling fluid flows 26, 27, which is not shown in the figures for clarity. For example, the actor may mechanically adjust a guiding element of the fluid flow dividing element 25, or may be an active flow valve for at least one of the partial cooling fluid flows 26, 27. The cooling arrangement 17, in turn, may comprise a control device (not shown), which controls the actuator depending on measured temperature information regarding the first and second partial cooling flows 26, 27. The cooling arrangement 17 may, for example, comprise at least one temperature sensor (not shown). The control device may then be configured to control the actuator to adjust the distribution of the incoming cooling fluid flow 24 to the partial cooling fluid flows 26, 27 depending on sensor data from the at least one temperature sensor. If more heat is to be dissipated from one the cooling paths, the respective partial cooling fluid flow 26, 27 may receive a larger fraction of the incoming fluid flow 24.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A generator for a wind turbine having a rotor and a stator separated radially by an air gap, wherein the stator comprises at least one stator segment, which comprises a stack of lamination sheets and at least one stator winding, and a stator support structure supporting the at least one stator segment, wherein the generator further comprises a cooling arrangement for providing cooling fluid at least to the air gap,
   wherein the cooling arrangement further comprises a cooling fluid flow dividing element for dividing an incoming cooling fluid flow to the stator into a first partial cooling fluid flow directed to a coil overhang and the air gap for cooling an air gap side of the at least one stator segment and a second partial cooling fluid flow directed to the stator support structure for cooling a non-air gap side of the at least one stator segment,
   wherein both partial cooling fluid flows are completely separated over their whole cooling path, and
   wherein the cooling fluid flow dividing element comprises at least one actuator controllable by at least one control device of the cooling arrangement for adjusting a distribution of the incoming cooling fluid flow to the partial cooling fluid flows.

2. The generator according to claim 1, wherein the incoming cooling fluid flow is provided by at least one pump or pumping means at at least one side of the stator and/or that, if the incoming cooling fluid flow is provided at both a drive end side and a non-drive end side, the cooling arrangement comprises cooling fluid flow dividing elements on both end sides.

3. The generator according to claim 1, wherein the cooling fluid flow dividing element is shaped to create the partial cooling fluid flows with predetermined fractions of the incoming cooling fluid flow.

4. The generator according to claim 1, wherein the second partial cooling fluid flow is directed to at least one area and/or element of the stator support structure which is directly adjacent to a radially inner end of the at least one stator segment.

5. The generator according to claim 1, further comprising at least one radially extending cooling duct having an opening to the air gap, wherein the first partial cooling fluid flow at least partly enters the at least one radially extending cooling duct.

6. The generator according to claim 4, wherein the second partial cooling fluid flow is directed to a cooling channel in and/or a radially inner surface of a segment support element.

7. The generator according to claim 1, wherein the cooling arrangement comprises a closed or open cooling circuit for the cooling fluid flow.

8. The generator according to claim 7, wherein the closed cooling circuit comprises a heat exchanger located in an inner chamber of the stator support structure.

9. The generator according to claim 1, wherein the stator support structure comprises cooling fins and/or a cooling channel, wherein the second partial cooling fluid flow is directed to the cooling fins and/or the cooling channel.

10. The generator according to claim 9, wherein the stator support structure comprises at least one, element having a structured surface providing the cooling fins and/or the cooling channel.

11. The generator according to claim 10, wherein the cooling channel is formed by contacting surfaces of two adjacent sub-elements of the stator support structure, wherein at least one of the contacting surfaces is a structured surface.

12. A wind turbine, comprising the generator according to claim 1.

13. A method for cooling a generator of a wind turbine, the generator having a rotor and a stator separated radially by an air gap, wherein the stator comprises at least one stator segment, which comprises a stack of lamination sheets and at least one stator winding, and a stator support structure supporting the at least one stator segment, wherein the generator further comprises a cooling arrangement for the generator for providing cooling fluid at least to the air gap,
  wherein an incoming cooling fluid flow to the stator is divided into a first partial cooling fluid flow directed to a coil overhang and the air gap for cooling an air gap side of the at least one stator segment and a second partial cooling fluid flow directed to the stator support structure for cooling a non-air gap side of the at least one stator segment by a cooling fluid flow dividing element of the cooling arrangement,
wherein both partial cooling fluid flows are completely separated over their whole cooling path, and
wherein the cooling fluid flow dividing element comprises at least one actuator controllable by at least one control device for adjusting a distribution of the incoming cooling fluid flow to the partial cooling fluid flows.

14. A generator for a wind turbine comprising:
a rotor and a stator separated radially by an air gap, wherein the stator comprises at least one stator segment having a stack of lamination sheets and at least one stator winding, and a stator support structure supporting the at least one stator segment,
wherein the generator further comprises a cooling arrangement for providing cooling fluid at least to the air gap, wherein the cooling arrangement includes a cooling fluid flow dividing element for dividing an incoming cooling fluid flow to the stator into a first partial cooling fluid flow directed to a coil overhang and the air gap for cooling an air gap side of the at least one stator segment and a second partial cooling fluid flow directed to the stator support structure for cooling a non-air gap side of the at least one stator segment,
wherein the at least one stator segment includes at least one radially extending cooling duct having an opening to the air gap, wherein the first partial cooling fluid flow at least partly enters the at least one cooling duct,
wherein both partial cooling fluid flows are completely separated over their whole cooling path, and
wherein the cooling fluid flow dividing element comprises at least one actuator controllable by at least one control device for adjusting a distribution of the incoming cooling fluid flow to the partial cooling fluid flows.

* * * * *